United States Patent
Roychowdhury et al.

(10) Patent No.: US 10,884,396 B2
(45) Date of Patent: Jan. 5, 2021

(54) SENSOR BASED SMART SEGMENTATION

(71) Applicant: General Electric Company, Schenectady, NY (US)

(72) Inventors: Subhrajit Roychowdhury, Schenectady, NY (US); Vipul Kumar Gupta, Guilderland, NY (US); Randal T Rausch, Schenectady, NY (US); Justin John Gambone, Schenectady, NY (US); Xiaohu Ping, Clifton Park, NY (US); Alexander Chen, Cypress, CA (US); John Erik Hershey, Ballston Lake, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/287,192

(22) Filed: Feb. 27, 2019

(65) Prior Publication Data
US 2020/0272128 A1     Aug. 27, 2020

(51) Int. Cl.
   *G06T 19/00*       (2011.01)
   *G05B 19/4099*   (2006.01)
   (Continued)

(52) U.S. Cl.
CPC .......... *G05B 19/4099* (2013.01); *B33Y 50/02* (2014.12); *G05B 13/0265* (2013.01);
(Continued)

(58) Field of Classification Search
CPC ..................................................... G06T 19/00
(Continued)

(56) References Cited

U.S. PATENT DOCUMENTS

| 8,478,044 B2 | 7/2013 | Grady et al. |
| 8,658,250 B2 | 2/2014 | Batchelder et al. |

(Continued)

FOREIGN PATENT DOCUMENTS

| AU | 2003264580 B2 | 8/2006 |
| CN | 103295218 A | 9/2013 |

OTHER PUBLICATIONS

Xia, Renbo et al., "An Optimal Initialization Technique for Improving the Segmentation Performance of Chan-Vese Model", 2007 IEEE International Conference on Automation and Logistics, Jinan, China, 2007, (pp. 411-415, 5 total pages).
(Continued)

*Primary Examiner* — Suresh Suryawanshi
(74) *Attorney, Agent, or Firm* — Buckley, Maschoff & Talwalkar LLC

(57) ABSTRACT

According to some embodiments, system and methods are provided comprising receiving, via a communication interface of a platform comprising a segmentation module and a processor, a defined geometry for one or more geometric structures forming one or more parts, wherein the parts are manufactured with an additive manufacturing machine; generating a build file including an initial parameter set to fabricate each part; fabricating the part based on the build file; receiving sensor data for the fabricated part; generating a parameter set for each layer that forms the part, via execution of an iterative learning control process for each layer; generating raw power data for each layer that forms the part, using the processor, based on the generated parameter set; applying a noise reduction process to the raw power data; and generating a segmented build file, using the segmentation module, via application of the noise reduction process on the raw power data. Numerous other aspects are provided.

20 Claims, 8 Drawing Sheets

(51) Int. Cl.
*B33Y 50/02* (2015.01)
*G05B 13/02* (2006.01)
(52) U.S. Cl.
CPC .............. *G05B 2219/35134* (2013.01); *G05B 2219/49007* (2013.01)
(58) Field of Classification Search
USPC .......................................................... 700/98
See application file for complete search history.

(56) References Cited

U.S. PATENT DOCUMENTS

| | | | | |
|---|---|---|---|---|
| 9,437,119 | B1* | 9/2016 | Bernal | .................... G09B 23/34 |
| 9,915,733 | B2 | 3/2018 | Fried et al. | |
| 9,977,425 | B1* | 5/2018 | McCann | ............ G05B 23/0221 |
| 10,011,079 | B2 | 7/2018 | Wighton et al. | |
| 2008/0059946 | A1* | 3/2008 | Harding | .................... G06F 8/71 |
| | | | | 717/106 |
| 2015/0120243 | A1* | 4/2015 | David | .................... H01L 22/12 |
| | | | | 702/172 |
| 2015/0142153 | A1* | 5/2015 | Chun | .................... B29C 64/386 |
| | | | | 700/98 |
| 2018/0178543 | A1 | 6/2018 | Fujimoto | |
| 2018/0237329 | A1* | 8/2018 | Drewnowski | .......... B33Y 10/00 |
| 2018/0268549 | A1* | 9/2018 | Bystrov | ................ G06T 11/005 |
| 2018/0330018 | A1* | 11/2018 | Wojczyk, Jr. | ........ G06K 9/4604 |
| 2018/0341248 | A1* | 11/2018 | Mehr | .................... B33Y 50/02 |
| 2019/0004496 | A1* | 1/2019 | Blom | .................... G01B 11/02 |
| 2019/0033828 | A1* | 1/2019 | Madelone, Jr. | ........ B33Y 30/00 |
| 2020/0094478 | A1* | 3/2020 | Zediker | ................ B23K 26/127 |

OTHER PUBLICATIONS

Hagedorn-Ansen, Devon, "The Effects of Developed Selective Laser Melting Strategies on Titanium Hybrid Parts", SUN Scholar Research Repository, Mar. 2017, 187pgs.

* cited by examiner

SENSOR BASED SMART SEGMENTATION

BACKGROUND

Additive manufacturing (AM) processes are used to fabricate precision three-dimensional objects from a digital model. Such objects are fabricated using an additive process performed by an additive manufacturing machine (AMM) under computer control to create an object using digital model data from a 3D model. Synonyms for additive manufacturing include additive fabrication, additive processes, additive techniques, additive layer manufacturing, layer manufacturing, freeform fabrication, D3 printing, rapid proto-typing, and direct digital manufacturing (DDM). An example of an AMM is a 3D printer, which can use a variety of technologies to melt, fuse, sinter, amalgamate, or otherwise physically or chemically modify a dispensed material to form a structure that has desired properties. The AMM may form the object by solidifying successive layers of material one on top of the other on a build plate. Some AM systems use a laser (or similar energy source) and a series of lenses and mirrors to direct the laser over a powdered material in a pattern provided by a digital model (e.g., powder-bed AM). The laser solidifies the powdered material by sintering or melting the powdered material. The term "direct metal laser melting" (DMLM) may more accurately reflect the nature of this process since it typically achieves a fully developed, homogenous melt-pool and fully dense bulk upon solidification. The nature of the rapid, localized heating and cooling of the melted material enables near-forged material properties, after any necessary heat treatment is applied.

The DMLM process uses a 3D computer-aided design (CAD) model of the object to be manufactured, whereby a CAD model data file is created and sent to the fabrication facility. A technician may work with the 3D model to properly orient the geometry for part building and may add supporting structures to the design, as necessary. Once this "build file" has been completed, it is "sliced" into layers of the proper thickness for the particular DMLM fabrication machine and downloaded to the machine to allow the build to begin. The metal powder on the build plate is fused into a solid part by melting it locally using the focused laser beam. In this manner, parts are built up additively, layer by layer. This process allows for highly complex geometries to be created directly from the 3D CAD data, automatically and without any tooling. DMLM produces parts with high accuracy and detail resolution, good surface quality, and excellent mechanical properties.

In conventional additive manufacturing practice, a part build plan (PBP) is generated for a particular part design and is executed by the additive manufacturing machine (AMM). Based on the PBP, the AMM controls multiple build parameters (parameter sets) that are applied during the build, including the travel path of the material addition zone and parameters governing the application and processing (e.g., melting) of the material. These parameter sets may account for the variation in different geometric regions of the part. In general, there is a complex relationship between these parameters and the quality of the built part.

The design of the parameter sets is an iterative process, which includes building a part based on a trial parameter sets, followed by assessment of the resulting trial part quality, and then modification of the trial parameter sets to adjust the expected part quality, building the next part, followed by assessment, etc. This iteration of trial parameter sets to meet overall manufacturing requirements, such as part quality and production rate, may require multiple iterations to attain the desired manufacturing requirements. This process, especially taking different parameter sets for different geometric areas of a part into consideration, is very time consuming, expensive and requires a lot of materials, labor, and equipment resources.

Therefore, it would be desirable to provide a system and method that optimizes the parameter set for building the part.

BRIEF DESCRIPTION

According to some embodiments, a method includes receiving, via a communication interface of a platform comprising a segmentation module and a processor, a defined geometry for one or more geometric structures forming one or more parts, wherein the parts are manufactured with an additive manufacturing machine; generating a build file including an initial parameter set to fabricate each part; fabricating the part based on the build file; receiving sensor data for the fabricated part; generating a parameter set for each layer that forms the part, via execution of an iterative learning control process for each layer; generating raw power data for each layer that forms the part, using the processor, based on the generated parameter set; applying a noise reduction process to the raw power data; and generating a segmented build file, using the segmentation module, via application of the noise reduction process on the raw power data.

According to some embodiments, a system includes a segmentation module; a segmentation processor; and a memory storing program instructions, the segmentation processor and the segmentation module operative with the program instructions to perform the functions as follows: receive a defined geometry for one or more geometric structures forming one or more parts, wherein the parts are manufactured with an additive manufacturing machine; generate a build file including an initial parameter set to fabricate each part; fabricate the part based on the build file; receive sensor data for the fabricated part; generate a parameter set for each layer that forms the part, via execution of an iterative learning control process for each layer; generate raw power data for each layer that forms the part based on the generated parameter set; apply a noise reduction process to the raw power data; and generate a segmented build file via application of the noise reduction process on the raw power data.

According to some embodiments, a non-transitory computer readable medium stores instructions that, when executed by a computer processor, cause the computer processor to perform a method comprising: receiving, via a communication interface of a platform comprising a segmentation module and a processor, a defined geometry for one or more geometric structures forming one or more parts, wherein the parts are manufactured with an additive manufacturing machine; generating a build file including an initial parameter set to fabricate each part; fabricating the part based on the build file; receiving sensor data for the fabricated part; generating a parameter set for each layer that forms the part, via execution of an iterative learning control process for each layer; generating raw power data for each layer that forms the part, using the processor, based on the generated parameter set; applying a noise reduction process to the raw power data; and generating a segmented build file, using the segmentation module, via application of the noise reduction process on the raw power data.

A technical effect of some embodiments of the invention is an improved technique and system for fabricating parts via AM processing. Some embodiments provide for the rapid optimization of process parameters for complex part geometries that are reproducible and robust using sensors and smart segmentation. As used herein, "smart segmentation" refers to automatic segmentation of part geometry based on a combination of model predictions and sensor-based parameter optimizations to identify regions which may be assigned similar parameter set(s) without incurring significant debit in part quality/performance. Embodiments may provide for sensor-enabled optimization of segments and segmentation boundaries, instead of the conventional manual characterization. Further, embodiments may provide for assignment of parameters for segmentation regions. Embodiments may provide for design of coupon geometry that is used for sensor-based optimization. As used herein, "sensor-based optimization" may refer to optimization of the parameters of the part. When a part is segmented well, the result may be several regions, where, in each region, the build parameters may be similar. The geometry may also be quite repetitive within a given region. As such, a build and then optimization may not be necessary for the entire region, but a subset (e.g., a coupon) that represents it. As a non-exhaustive example, if the part is a long symmetrical bar, the entire bar may not need to be built and optimized, but rather, a small vertical cross section may be sufficient for building and optimizing as the rest of the bar may just repeat this geometry. Embodiments may reduce cycle time for parameter development from months to weeks, or even days (or less). The smart segmentation may result in accelerated development of material parameters; as well as a cost savings in material parameter development. For example, and as mentioned above, a well-segmented part may result in regions that have similar qualities. Optimization may be run separately for each of these regions. Within each region, since the variation is smaller, optimal parameters may be obtained more quickly and accurately. It is noted that with better optimization of each region, as a result of the well-segmented part, the resulting build may be of higher quality. The reduced parameter development cycle may allow more efficient use of resources (personnel, materials, additive machines, characterization and testing equipment, etc.), and may provide for a reduced debit in material quality.

Embodiments may provide for the derivation of an estimate of geometric boundaries and associated parameters more accurately and much faster from sensor-based parameters generated by an iterative parameter development process.

With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

DRAWINGS

Figure 4:
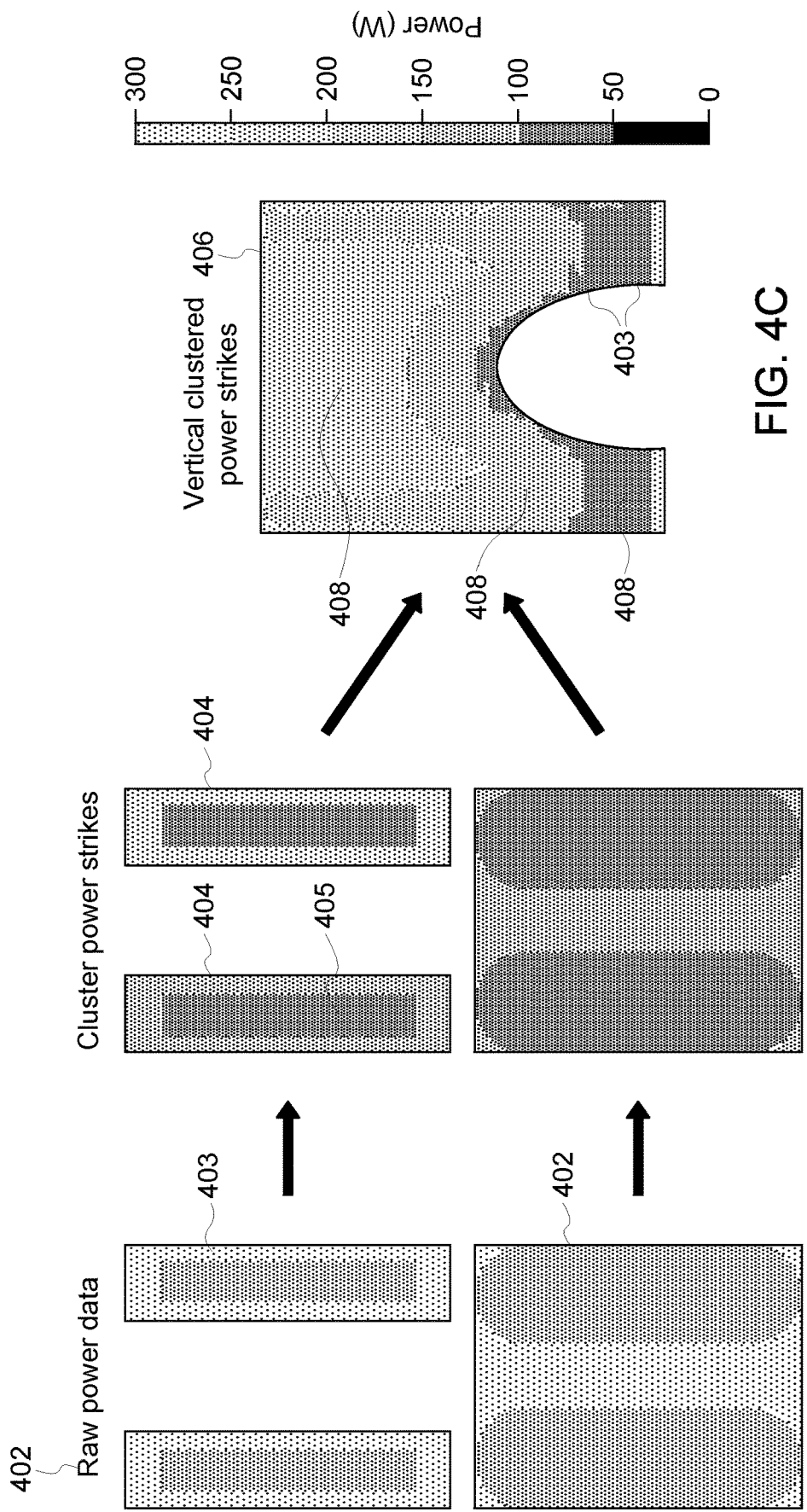

FIGS. 4A-C illustrates thermal images according to some embodiments.

Figure 5:
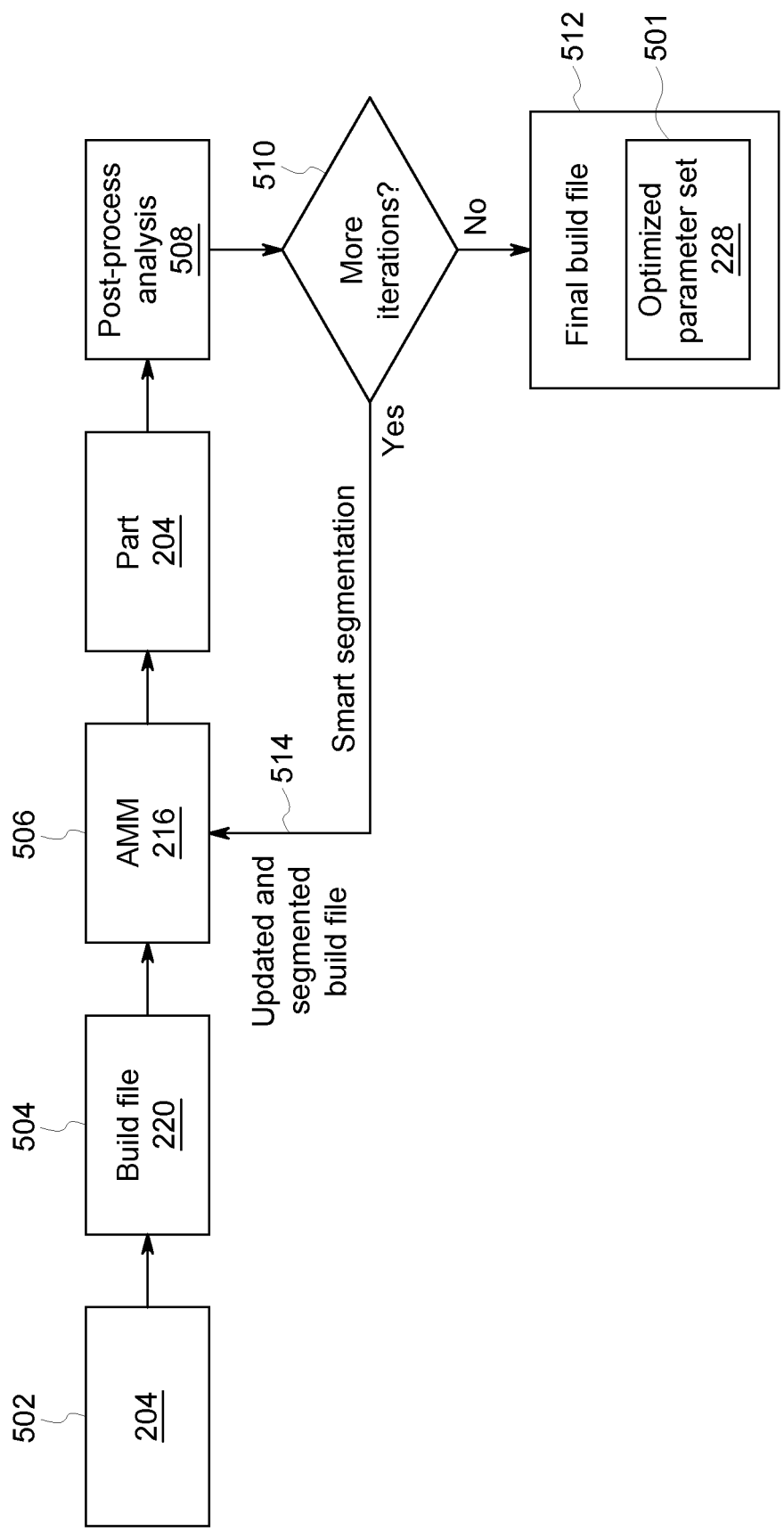

FIG. 5 illustrates a block diagram of a first smart segmentation process according to some embodiments.

Figure 6:
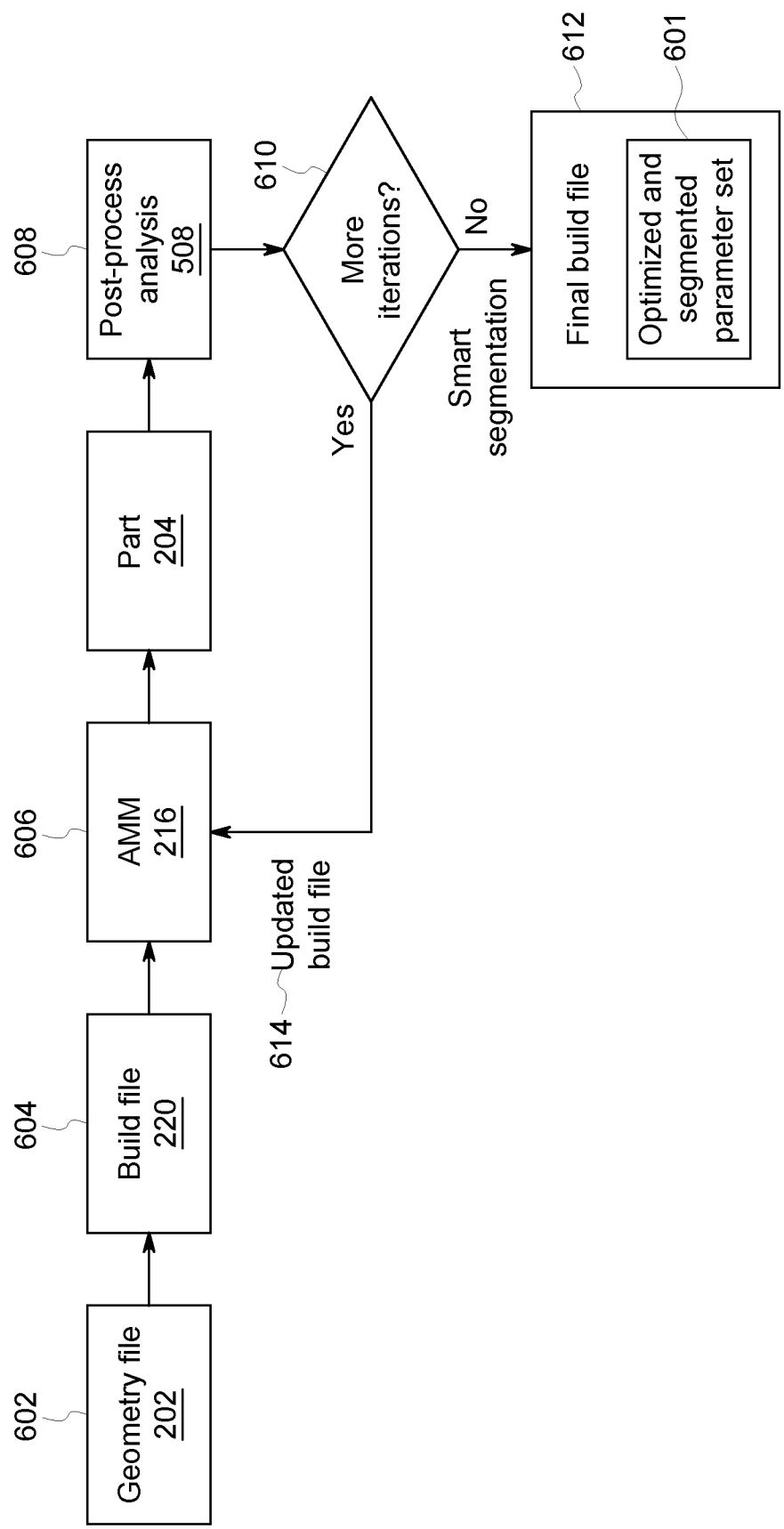

FIG. 6 illustrates a block diagram of a second smart segmentation process according to some embodiments.

Figure 7:
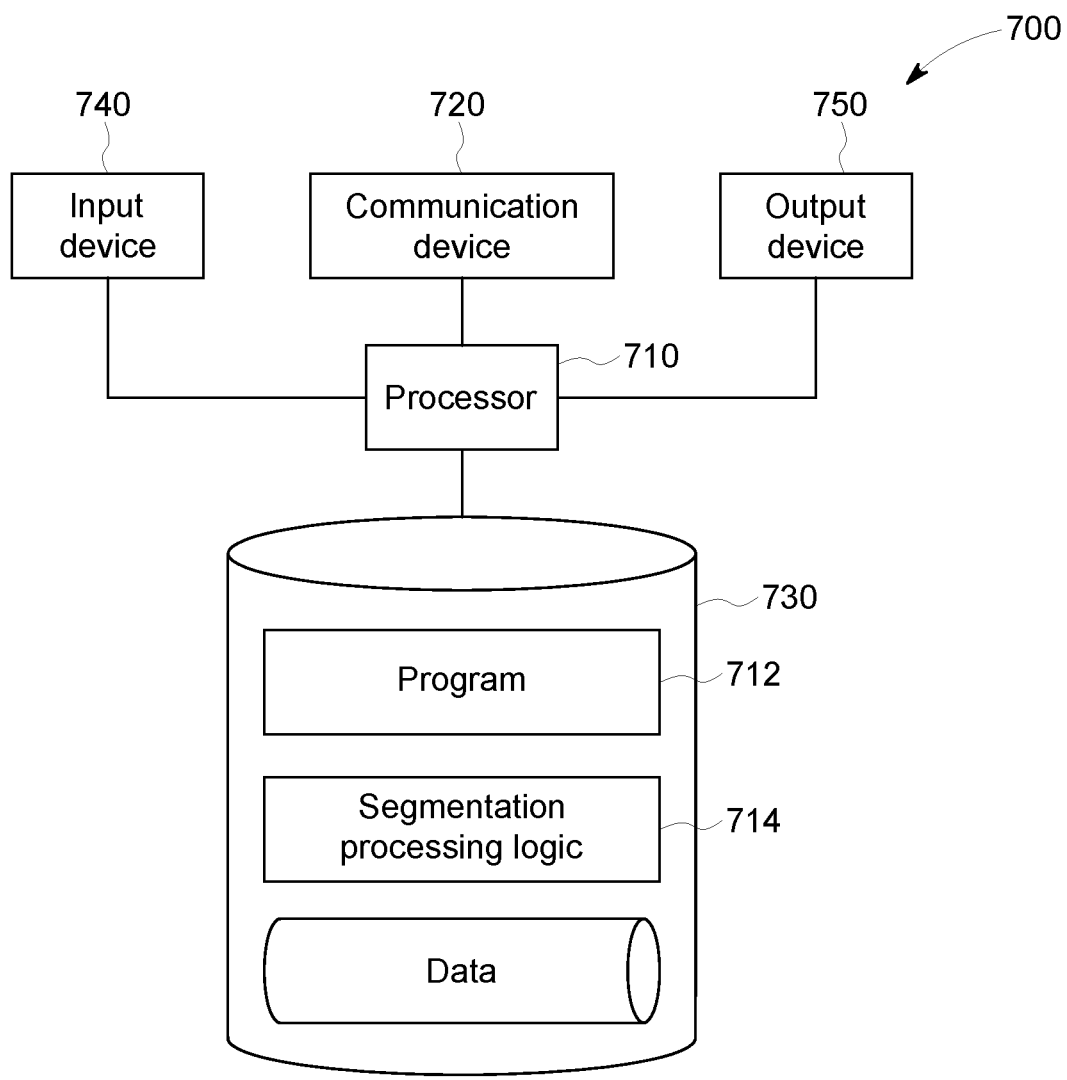

FIG. 7 illustrates a block diagram of a system according to some embodiments.

DETAILED DESCRIPTION

In disclosed embodiments, a test coupon ("coupon") is a representative test sample of the part being manufactured by AM. Coupons may be simple shapes suitable for analysis that contain one or more features and may be representative of the parts being built. The features may include, but are not limited to, bulk, contour, thin-walls, downside (over-hangs of different angles), thru holes (for dimensional tolerances), and upside (top surface of part, dome, etc.).

Figure 1A:
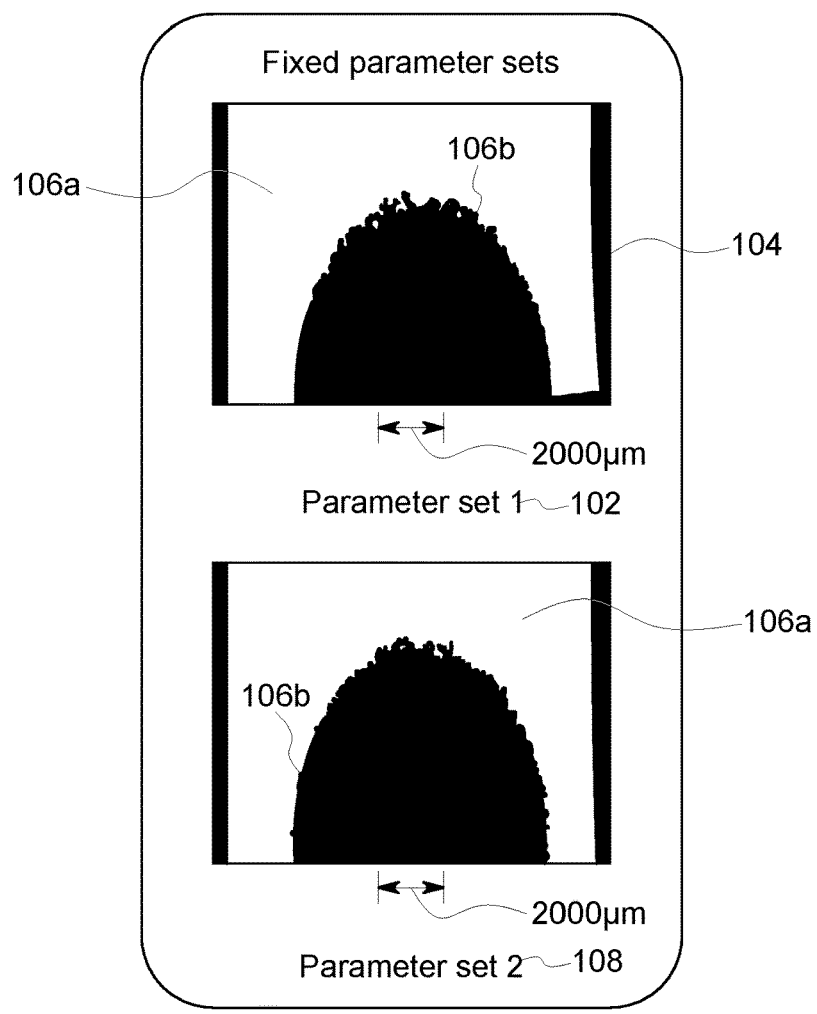
FIGS. 1A-1C illustrate prior art images.

In AMM, a part that is ultimately fabricated may include one or more geometric structures (e.g., the above-described "features"). Each of the geometric structures may have different qualities. For example, a bulk region may have a different thermal leakage as compared to a downside of an arch (i.e., over-hang region). As such, using a single fixed parameter set for the fabrication of the part may result in disparities in quality across the part. As a non-exhaustive example of the prior art, shown in FIG. 1A, when a first parameter set 102 is used to fabricate the part 104, having two geometric structures 106 (e.g., a bulk region 106a, and a downside region 106b), the fabricated part 104 has a relatively low or no porosity in the bulk region 106a, but a poor surface finish in the downside region 106b. Similarly, when a second parameter set 108 is used to fabricate the same part, the fabricated part 104 has a higher porosity in the bulk region 106a and an improved surface finish in the downside region 106b. When the surfaces of the geometric features are rough (e.g., poor surface finish), for example, that area may be a failure location when the part is under stress. As such, it may be desirable to avoid rough surfaces, for example.

Figure 1B:
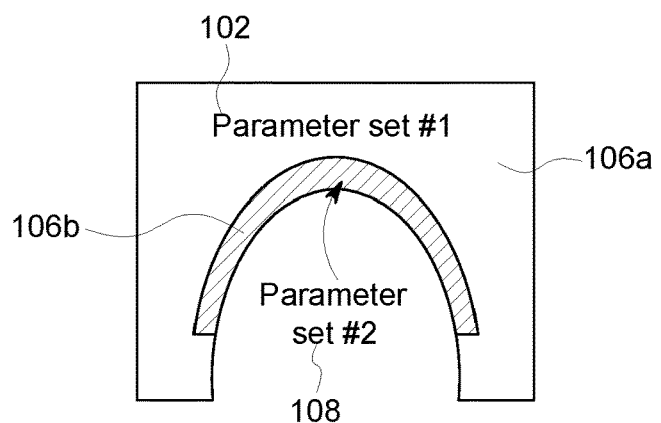
Figure 1C:
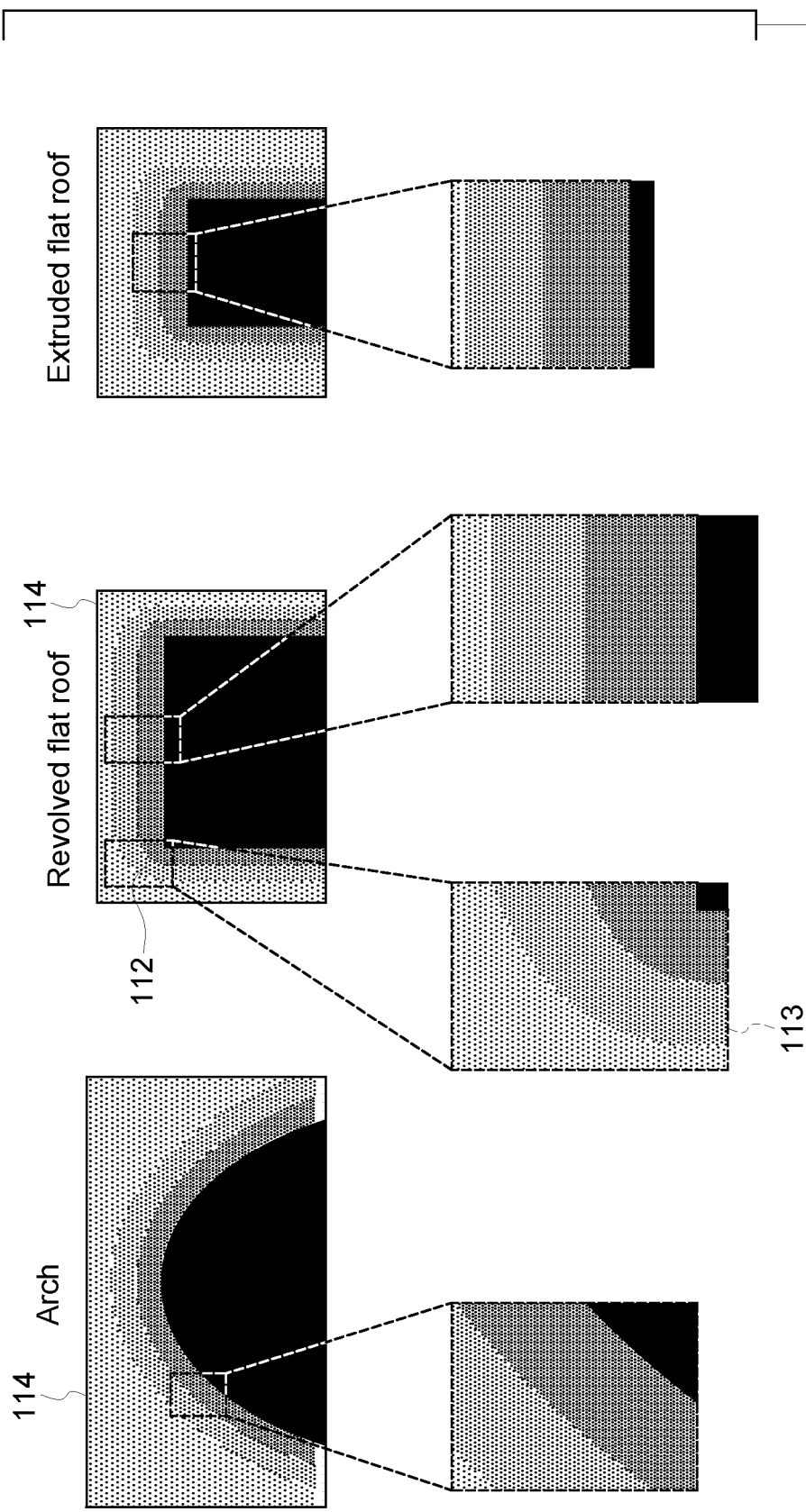
Figure 2:
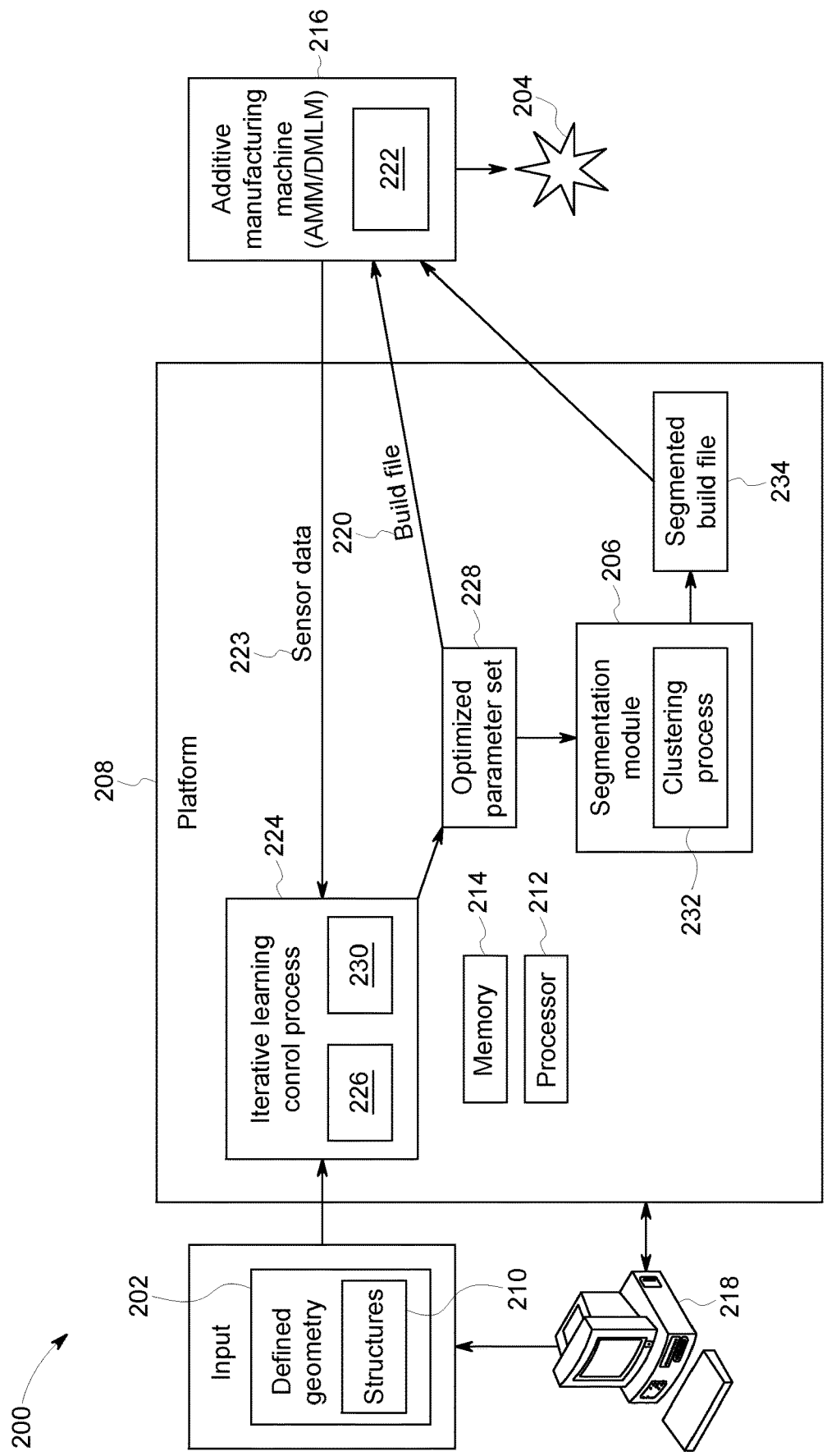
FIG. 2 illustrates a system according to some embodiments.

When determining a parameter set for a layer that includes multiple geometric structures, it may be desirable to segment or divide the layer into different regions, and have different parameter sets for the different regions. For example, in the prior art shown in FIG. 1B, the fabricated part 104 may be manually segmented into two regions—the bulk region 106a and the downside region 106b, where the first parameter set 102 is applied to form the bulk region 106a and the second parameter set 108 is applied to form the downside region 106b. However, conventional manual segmentation processes are time consuming and expensive, and typically result in a limited number of regions per part. For example, the manual segmentation process includes the fabrication of an entire coupon, cut-up of the coupon, experiments executed on the cut-ups, analysis and then manual determination of segments and a fixed parameter set within a region/segment. It is noted that the entire coupon is fabricated as the cut-up experiments may be done on the part, not just a single/few layers. Some limitations of this manual segmentation include, but are not limited to, coarse resolution of parameter variation, the introduction of unnecessary seams in the layers where the parameters change between regions with independent fixed strikes (e.g., a first laser power is applied to a first region (e.g., power strike), the laser contact ceases, then a second laser power is applied to a second region, the laser contact ceases, then a third laser power is applied to a third region etc.). Another disadvantage of the manual segmentation approach is that the boundary of the power level segments (e.g., the seams) tend to be likely weak or failure points for the part. Further, even within a segmented region there is a disparity based on the geometry. As another non-exhaustive example, shown in FIG. 1C, for a downward facing surface (e.g., arch, revolved flat roof, extruded flat roof), there is thermal leakage variation within the different parts 112 of the region, indicated by different shading in the expanded view 113 of the part 112 of the thermal leakage maps 114.

As an improvement to the manual segmentation process using fixed power strikes, an iterative learning control (ILC) process may be used to determine a set of optimized parameters for multiple boundaries/regions in a faster amount of time. The faster determination time may also allow for a greater number of regions to be determined, as compared to the manual segmentation process. It is also noted that the segmentation with ILC may be segmentation at a finer scale than a manual segmentation may yield, as automatic algorithms that make segmentation decisions based on the data may be used. With the ILC approach, an initial guess for build parameters may be estimated based on a model which can be executed quickly. The result of an iteration is recorded in sensors within the AMM and compared to a previously-generated reference, e.g., the result of a previous iteration or the output of a model. The estimation error may then be fed back to improve the model via tracking filter and the updated model is used to generate a new set of build parameters (e.g., parameters used to fabricate the part/coupon). The build parameters may then be further tuned using the tracking error as desired. Additionally, during the ILC process, a set of thermal data is generated based on a thermal model of the part derived from a first set of build parameters. As described above, the ILC process may produce a second set of build parameters (e.g., in an iteration). The second set of build parameters may be, for example, based on received sensor data, a determined evaluation parameter and the generated thermal data. Thermal data may be used in ILC as when a part being built has difficult geometry, such as an over-hang region, there may be a relatively deep and/or wide melt-pool due to reduced thermal conductivity in the region in question, i.e., less heat is conducted away from the region by the bulk material of the part, resulting in poor surface finish and, in-turn, reduced part quality. In such a case, a relatively large power reduction (i.e., reduced heat input) of the laser may be needed to compensate. In other words, the larger the melt-pool, the larger the power "delta" that is needed. These thermal factors may be accounted for by the thermal model in determining the parameter set. In one or more embodiments, the thermal model may provide data on the thermal leakage away from a given point. This may then be used to determine power "delta".

The generation of the thermal data may include computing a first set of thermal data values based on a nominal thermal model and the first set of build parameters. The generation of the thermal data may include determining an updated thermal model based on a comparison of the first set of computed thermal data values to the received sensor data; and computing a second set of thermal data values based on the updated thermal model. The nominal thermal model may be derived by: dividing a volume of the part into voxels; determining a relative amount of surrounding material within a defined radius of a center of each of the voxels; and computing thermal data values for each voxel based on the relative amount of surrounding material. The sensor data may be received from at least one of a laser power sensor, an actuator sensor, a melt-pool sensor, and an environmental sensor.

The ILC process may use the thermal data to define region boundaries for the different parameter sets. Unlike the manual segmentation process, which includes two or more independent, fixed strikes, the ILC process may have one continuous strike, using variable parameters (e.g. power). As used herein, a "continuous strike" may refer to the continuous variation of the power with the laser strike (e.g., slowly increase the power from 100 W to 200 W along a line). In manual segmentation, on the other hand, there may be discontinuities with the laser (e.g., 100 W for half of a line, then 200 W for the second half of the line), which may result in more seams. As used herein, a "segment" is a region of the part bounded with a respective parameter set. The terms "segment" and "region" may be used interchangeably herein.

Although the ILC process for segmentation is an improvement over the manual segmentation, the ILC process of segmentation includes some limitations, including but not limited to: 1. sensor noise which may generate variations in power on the parameter set (and may be evidenced by an unclear boundary between color levels in the thermal images); 2. the AMM is qualified for just a few parameter sets (e.g., the AMM can handle 2-5 parameter sets, while the ILC process generates 9 parameter sets); and 3. design rules from the governing body for the material used in the AMM, which may be contrary to the ILC process.

In one or more embodiments, a segmentation module may use this thermal data from the ILC process to generate regions, and parameter sets for those regions, that overcome at least the limitations of the ILC process described above.

Figure 3:
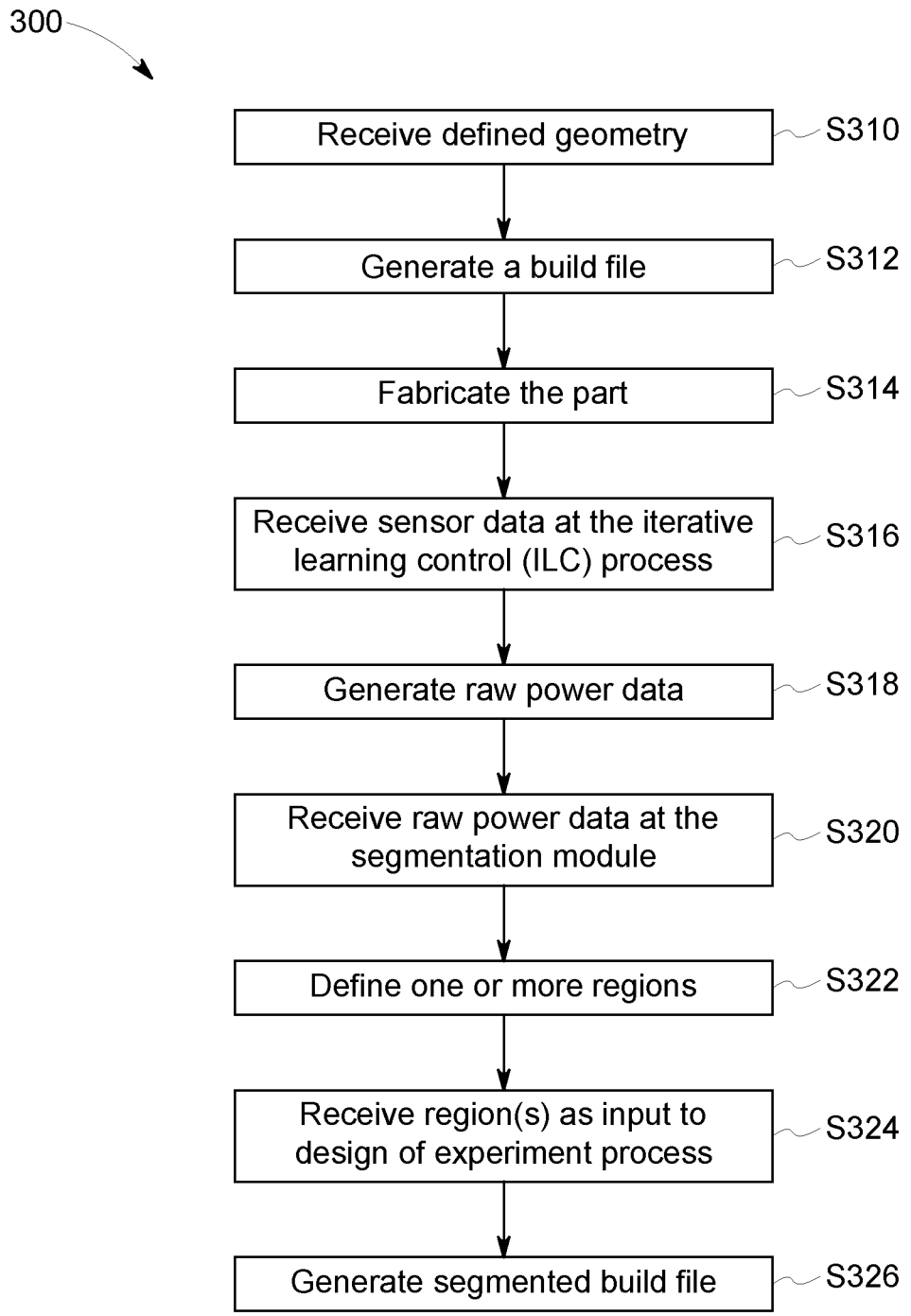
FIG. 3 illustrates a flow diagram according to some embodiments.

Turning to FIGS. 2-7, a system 200 and diagrams of examples of operation according to some embodiments are provided. In particular, FIG. 3 provides a flow diagram of a process 300, according to some embodiments. Process 300 and other processes described herein may be performed using any suitable combination of hardware (e.g., circuit(s)), software or manual means. In one or more embodiments, the system 200 is conditioned to perform the process 300 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto.

Initially at S310, a defined geometry 202 for one or more parts 204 is received at a segmentation module 206 on a platform 208 of a system 200. In one or more embodiments, each part 204 manufactured by an AM process may include one or more geometric structures 210, and each part 204 may be formed from one or more layers 403 (FIG. 4C). The defined geometry 202 may be received via a CAD file, or other suitable file.

In one or more embodiments, the system 200 may include one or more processing elements 212 and a memory/computer data store 214. The processor 212 may, for example, be a microprocessor, and may operate to control the overall functioning of the segmentation module 206. In one or more embodiments, the segmentation module 206 may include a communication controller for allowing the processor 212, and hence the segmentation module 206, to engage in communication over data networks with other devices (e.g., the additive manufacturing device 216 and user interface device 218).

In one or more embodiments, the system 200 may include one or more memory and/or data storage devices 214 that store data that may be used by the module. The data stored in the data store 214 may be received from disparate hardware and software systems associated with AMM, or otherwise, some of which are not inter-operational with one another. The systems may comprise a back-end data environment employed by a business, industrial or personal context.

In one or more embodiments, the data store 214 may comprise any combination of one or more of a hard disk drive, RAM (random access memory), ROM (read only memory), flash memory, etc. The memory/data storage devices 214 may store software that programs the processor 212 and the segmentation module 206 to perform functionality as described herein.

As used herein, devices, including those associated with the system 200 and any other devices described herein, may exchange information and transfer input and output ("communication") via any number of different systems. For example, wide area networks (WANs) and/or local area networks (LANs) may enable devices in the system to communicate with each other. In some embodiments, communication may be via the Internet, including a global internetwork formed by logical and physical connections between multiple WANs and/or LANs. Alternately, or additionally, communication may be via one or more telephone networks, cellular networks, a fiber-optic network, a satellite network, an infrared network, a radio frequency network, any other type of network that may be used to transmit information between devices, and/or one or more wired and/or wireless networks such as, but not limited to Bluetooth access points, wireless access points, IP-based networks, or the like. Communication may also be via servers that enable one type of network to interface with another type of network. Moreover, communication between any of the depicted devices may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

Turning back to the process 300, a build file 220 is generated for fabricating one or more layers of a coupon or part 204 in S312. In one or more embodiments, the build file 220 may include an initial parameter set for the lasers to fabricate the coupon or part. The initial parameter set may include input parameters for laser power, focus or spot-size and scan speed. Other suitable parameters may be included. The initial parameter set may be derived based on available ranges for the additive machine, prior experiments, design of experiments, or user-defined. The part 204 is then fabricated in S314.

In one or more embodiments, while the manufacturing process is being run, sensors 222 such as photo-diodes and cameras may be used to measure characteristics of the melt-pool, e.g., size, shape, temperature and temperature gradient. It is noted that sensor data noise (e.g., sensor inherent or sensor detected) may be included in calculations involving raw power and it may be desirable to minimize this noise. In one embodiment, the sensors 222 may incorporate one or more physical components to reduce sensor detected noise from off-axis radiation and optical disjoint from the spectrum of interest. The physical components include, but are not limited to, physical baffles affixed to the sensor to block off-axis radiation from sensor detection and simple optical filters to restrict the bandwidth of the detected radiation. The physical components may reduce sensor noise in a particular machine and sensor placement, and also reduce signal variations between different machine environments and geometric placements. The sensor data 223 may, for example, show that laser parameters do not necessarily translate into stable melt-pool characteristics. For example, the measured photodiode signal may not be constant, i.e., it may have variation and may not be a clean signal with respect to spatial locations of the part. In S316, the sensor data 223 for the fabricated part may be received at the iterative learning control (ILC) process 224. The ILC process 224 may include an algorithm 226 that is trained by making several builds of the part and performing physical testing, e.g., cut-ups and/or volumetric computed-tomography (CT), etc., to measure anomalies/defects, such as cracks, pores, lack-of-fusion defects. The ILC process 224 may output a parameter set 228. The output parameter set 228 may be an optimized parameter set and may act as part of the build file to be input to the AMM 216 to fabricate the part 206.

As also described above, a thermal model 230 (i.e., a heat dissipation model for a part being built) may be used in the ILC process 224 to determine the optimized parameter set 228. The thermal data output from the thermal model (e.g., reference intensity) may be compared to the thermal data received from the sensors 222 to generate raw power data 402 (FIG. 4A) for each layer that forms the part. In S318, the raw power data 402 may be the generated output from a comparison of the reference thermal intensity (e.g., thermal model 230 output based on particular parameters input to the thermal model) to the thermal intensity sensed by the one or more sensors during formation of the part. In one or more embodiments the raw power equals the input power+k* (reference intensity−the sensor intensity). The inventors note that the raw power is based on the difference, but, in some embodiments, may be multiplied by a factor that tells how much to rely on the sensor data rather than the initial input power.

Next, in S320, the raw power data 402 is received at the segmentation module 206, to define region boundaries for the different parameter sets. It is noted that thresholding in the thermal model may be used to initially define the regions. Then, in one or more embodiments, the ILC process used may evolve the regions in each iteration, fine-tuning this initial result. As shown in FIG. 4A, the raw power data includes fuzzy edges and non-solid colors as a result of the noise in the data. The raw power data 402 shown in FIG. 4A is a planar view of two different layers 403—the top and bottom parts in FIG. 4A show two different layers. A noise reduction process 232 is applied to the raw power data 402 in S322. The noise reduction process 232 may include the application of a clustering algorithm. In one or more embodiments, the clustering algorithm may be a k-means clustering algorithm, or any other suitable process for reducing the noise in the raw power data. Continuing with the example shown in FIG. 4B, the clustered power strike images 404 display the raw power data 402 with the noise reduced per the defined edges 405. The laser strikes may then be assigned power based on the cluster they are in.

It is noted that the clustered power strike images 404 are generated for each layer of the part. As shown in FIG. 4B, the colors in the clustered power strike image 404 are more defined. The segmentation module 206 may define one or more regions 408 in S322, where each region is based on a different color. In one or more embodiments, after the clustered power strike image 404 is generated for each layer in S322, the layers may be combined into a stacked vertical view 406, as shown in FIG. 4C. While the segmentation module 206 may define the one or more regions without combining the layers, the layers may be combined for definition of the regions. As shown in FIG. 4C, for example, when the layers are stacked in the vertical stacked clustered power strike 406, the different color variations are more apparent, representing the different power intensities. Continuing with the non-exhaustive example in FIG. 4C, there may be 3-4 regions 408. Each region may have its own associated set of parameters. In one or more embodiments, the regions may be received as input to a design of experiment process to determine a parameter set for each of the different regions, in S324. The set of parameters for each of the different regions may be generated as a segmented build file 234 in S326. In one or more embodiments, the segmented build file 234 may be at least one of sent to the AMM to fabricate a part and/or output to a user platform 218 (a control system, a desktop computer, a laptop computer, a personal digital assistant, a tablet, a smartphone, etc.) to view information about and/or manage the operation of the AM device or to other systems (not shown), as appropriate (e.g., for display to, and manipulation by, a user) in accordance with any of the embodiments described herein. In one or more embodiments, the regions may be used to determine parameters that control the AMM to fabricate the parts.

Turning to FIGS. 5 and 6, it is noted that there may be at least two different ways in which the smart segmentation described herein may be implemented. FIG. 5 describes a process whereby S318-S322 are executed for each iteration of the ILC process 224. In other words, a geometry file 202 is received at 502, a build file 220 is output by the ILC process at 504. The part is fabricated from that segmented build file at 506, and the part is analyzed by a post-process analysis at 508. It is determined in 510 whether more iterations should be executed. When it is determined at 510, that no further iterations are needed (e.g., because a convergence criterion has been reached (e.g., average absolute difference between target power and input power has reached a certain threshold)), the build file may be output as the final build file 501 at 512. The final build file may be used to generate an optimized parameter set 228. It is noted that segmentation is part of the ILC process, which generates the optimized parameters (as well as the optimized segmentation regions). When it is determined at 510 that further iterations are needed, another iteration is executed via generation of a next build file, and the loop continues. More particularly, S318-S322 (e.g., "Smart segmentation") are applied to the build file to generate a new segmented build file at 514, with less noise than the build file output by the ILC process, and the process returns to 506, and a part is fabricated. This process may occur five or six times, for example, until a satisfactory build file is generated. The benefit of this process may be that more clear regions or segments may be determined as the segmentation module is applied to each iteration.

FIG. 6 describes a process whereby S318-S322 are executed only once on the build file after the ILC process is complete. In other words, a geometry file 202 is received at 602, a build file is output by the ILC process at 604. The part is fabricated from that segmented build file at 606, and the part is analyzed by a post-process analysis at 608. It is determined in 610 whether more iterations should be executed. When it is determined at 610, that no further iterations are needed (e.g., because desired objectives are met such as improved surface finish and reduced porosity content), S318-S322 (e.g., "Smart segmentation") are applied to the build file to generate a new segmented build file, which may be output as the final build file 601 at 612. When it is determined at 610 that further iterations are needed, another iteration is executed via the ILC process, an updated build file 614 is generated, and the loop returns to 606. The benefit of this process may be that, compared to the process in FIG. 5, the process in FIG. 6 is faster.

Note the embodiments described herein may be implemented using any number of different hardware configurations. For example, FIG. 7 illustrates a segmentation processing platform 700 that may be, for example, associated with the system 200 of FIG. 2. The segmentation processing platform 700 comprises a parameter development processor 710 ("processor"), such as one or more commercially available Central Processing Units (CPUs) in the form of one-chip microprocessors, coupled to a communication device 720 configured to communicate via a communication network (not shown in FIG. 7). The communication device 720 may be used to communicate, for example, with one or more users. The segmentation processing platform 700 further includes an input device 740 (e.g., a mouse and/or keyboard to enter information about the part) and an output device 750 (e.g., to output and display the data and/or recommendations).

The processor 710 also communicates with a memory/storage device 730. The storage device 730 may comprise any appropriate information storage device, including combinations of magnetic storage devices (e.g., a hard disk drive), optical storage devices, mobile telephones, and/or semiconductor memory devices. The storage device 730 may store a program 712 and/or segmentation processing logic 714 for controlling the processor 710. The processor 710 performs instructions of the programs 712, 714, and thereby operates in accordance with any of the embodiments described herein. For example, the processor 710 may receive input and then may apply the segmentation module 206 via the instructions of the programs 712, 714 to generate one or more regions for customized parameter sets for fabrication of a part.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

As used herein, information may be "received" by or "transmitted" to, for example: (i) the platform 700 from another device; or (ii) a software application or module within the platform 700 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a parameter development module. The method steps can then be carried out using the distinct software modules and/or sub-modules of the system, as described above, executing on one or more hardware processors 710 (FIG. 7). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A method comprising:
receiving, via a communication interface of a platform comprising a segmentation module and a processor, a defined geometry for one or more geometric structures forming one or more parts, wherein the parts are manufactured with an additive manufacturing machine;
generating a build file including an initial parameter set to fabricate each part;
fabricating the part based on the build file;
receiving sensor data for the fabricated part;
generating a parameter set for each layer that forms the part, via execution of an iterative learning control process for each layer, wherein the part is formed from a plurality of successive layers;
generating raw power data for each layer that forms the part, using the processor, based on the generated parameter set, wherein the raw power data is generated from a comparison of a reference thermal intensity to a thermal intensity received as part of the received sensor data for the fabricated part;
applying a noise reduction process to the raw power data; and
generating a segmented build file, using the segmentation module, via application of the noise reduction process on the raw power data.

2. The method of claim 1, wherein a segment is a region of the part bounded with a respective parameter set.

3. The method of claim 1, wherein the noise reduction process is a clustering algorithm.

4. The method of claim 3, wherein the clustering algorithm is k-means.

5. The method of claim 1, wherein the parameter set is optimized.

6. The method of claim 1, wherein the parameter set includes values for at least one of laser power, laser scan speed, focus or spot size, layer thickness and hatch spacing.

7. The method of claim 1, wherein the iterative learning control process is executed one or more times, and generates an optimized parameter set for each execution.

8. The method of claim 7, wherein the noise reduction process is applied to the raw power data generated via each execution of the iterative learning control process.

9. The method of claim 1, wherein the generated parameter set is a final iteration and wherein the noise reduction process is applied to the raw power data of the final iteration of the parameter set.

10. The method of claim 1, further comprising:
fabricating the part based on the segmented build file.

11. A system comprising:
a segmentation module;
a segmentation processor; and
a memory storing program instructions, the segmentation processor and the segmentation module operative with the program instructions to perform the functions as follows:
receive a defined geometry for one or more geometric structures forming one or more parts, wherein the parts are manufactured with an additive manufacturing machine;
generate a build file including an initial parameter set to fabricate each part;
fabricate the part based on the build file;
receive sensor data for the fabricated part;
generate a parameter set for each layer that forms the part, via execution of an iterative learning control process for each layer, wherein the part is formed from a plurality of successive layers;
generate raw power data for each layer that forms the part based on the generated parameter set, wherein the raw power data is generated from a comparison of a reference thermal intensity to a thermal intensity received as part of the received sensor data for the fabricated part;
apply a noise reduction process to the raw power data; and
generate a segmented build file via application of the noise reduction process on the raw power data.

12. The system of claim 11, wherein a segment is a region of the part bounded with a respective parameter set.

13. The system of claim 11, wherein the noise reduction process is a clustering algorithm.

14. The system of claim 11, wherein the parameter set is optimized.

15. The system of claim 11, wherein the iterative learning control process is executed one or more times, and generates an optimized parameter set for each execution.

16. The system of claim 15, wherein the noise reduction process is applied to the raw power data generated via each execution of the iterative learning control process.

17. The system of claim 11, wherein the generated parameter set is a final iteration and wherein the noise reduction process is applied to the raw power data of the final iteration of the parameter set.

18. The system of claim 11, wherein the received sensor data is from one or more sensors incorporating at least one of physical baffles to block off-axis radiation and optical filters to restrict a bandwidth of a detected radiation.

19. A non-transitory computer-readable medium storing instructions that, when executed by a computer processor, cause the computer processor to perform a method comprising:

receiving, via a communication interface of a platform comprising a segmentation module and a processor, a defined geometry for one or more geometric structures forming one or more parts, wherein the parts are manufactured with an additive manufacturing machine;

generating a build file including an initial parameter set to fabricate each part;

fabricating the part based on the build file;

receiving sensor data for the fabricated part;

generating a parameter set for each layer that forms the part, via execution of an iterative learning control process for each layer, wherein the part is formed from a plurality of successive layers;

generating raw power data for each layer that forms the part, using the processor, based on the generated parameter set, wherein the raw power data is generated from a comparison of a reference thermal intensity to a thermal intensity received as part of the received sensor data for the fabricated part;

applying a noise reduction process to the raw power data; and generating a segmented build file, using the segmentation module, via application of the noise reduction process on the raw power data.

20. The medium of claim 19, wherein the noise reduction process is a clustering algorithm.

\* \* \* \* \*